Jan. 21, 1958
J. YOUNG
2,820,244
SHRIMP MACHINE
Filed June 28, 1956
4 Sheets-Sheet 1
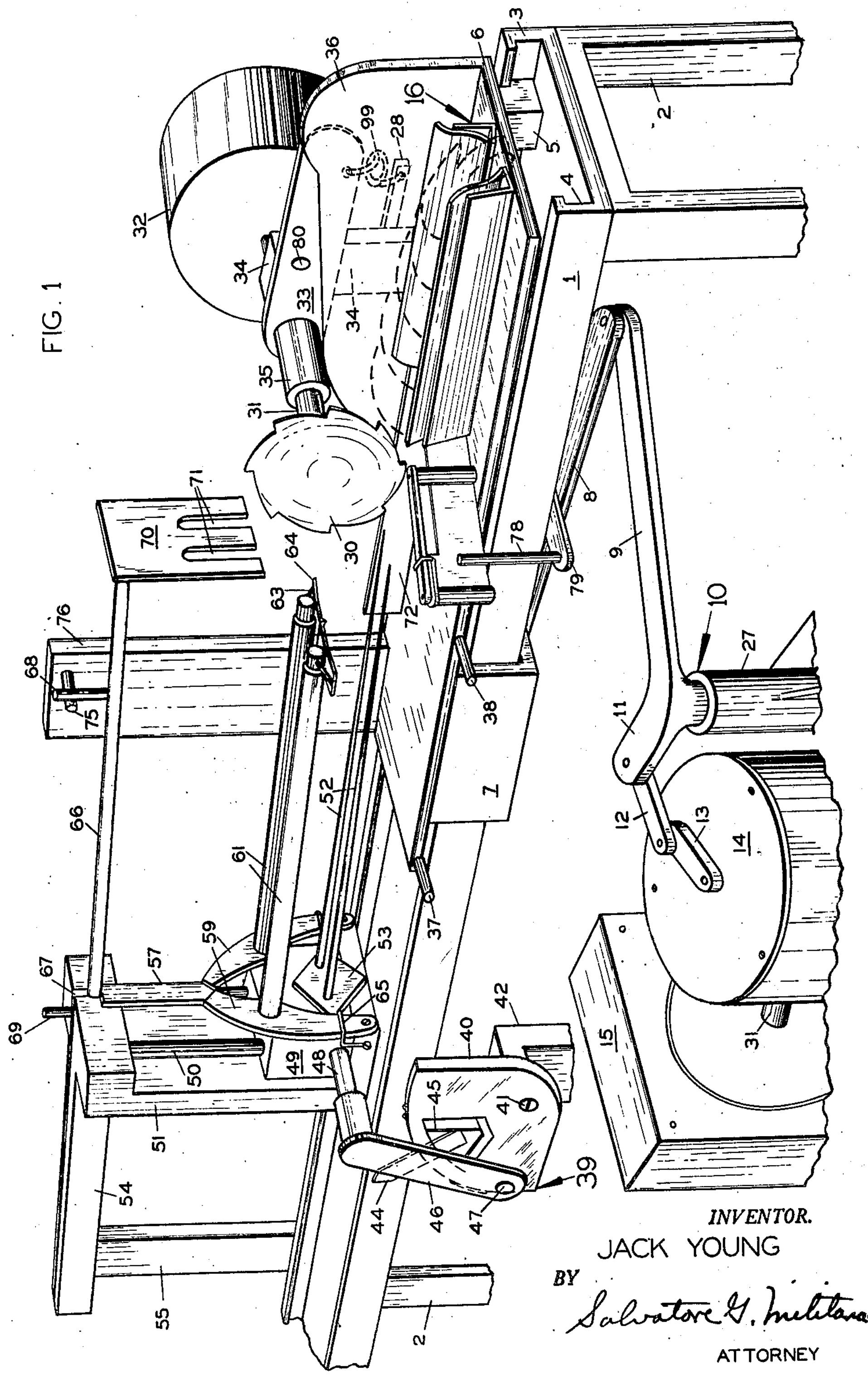
*INVENTOR.*
JACK YOUNG
*BY* Salvatore G. Militana
ATTORNEY Jan. 21, 1958 J. YOUNG 2,820,244
SHRIMP MACHINE
Filed June 28, 1956 4 Sheets-Sheet 2
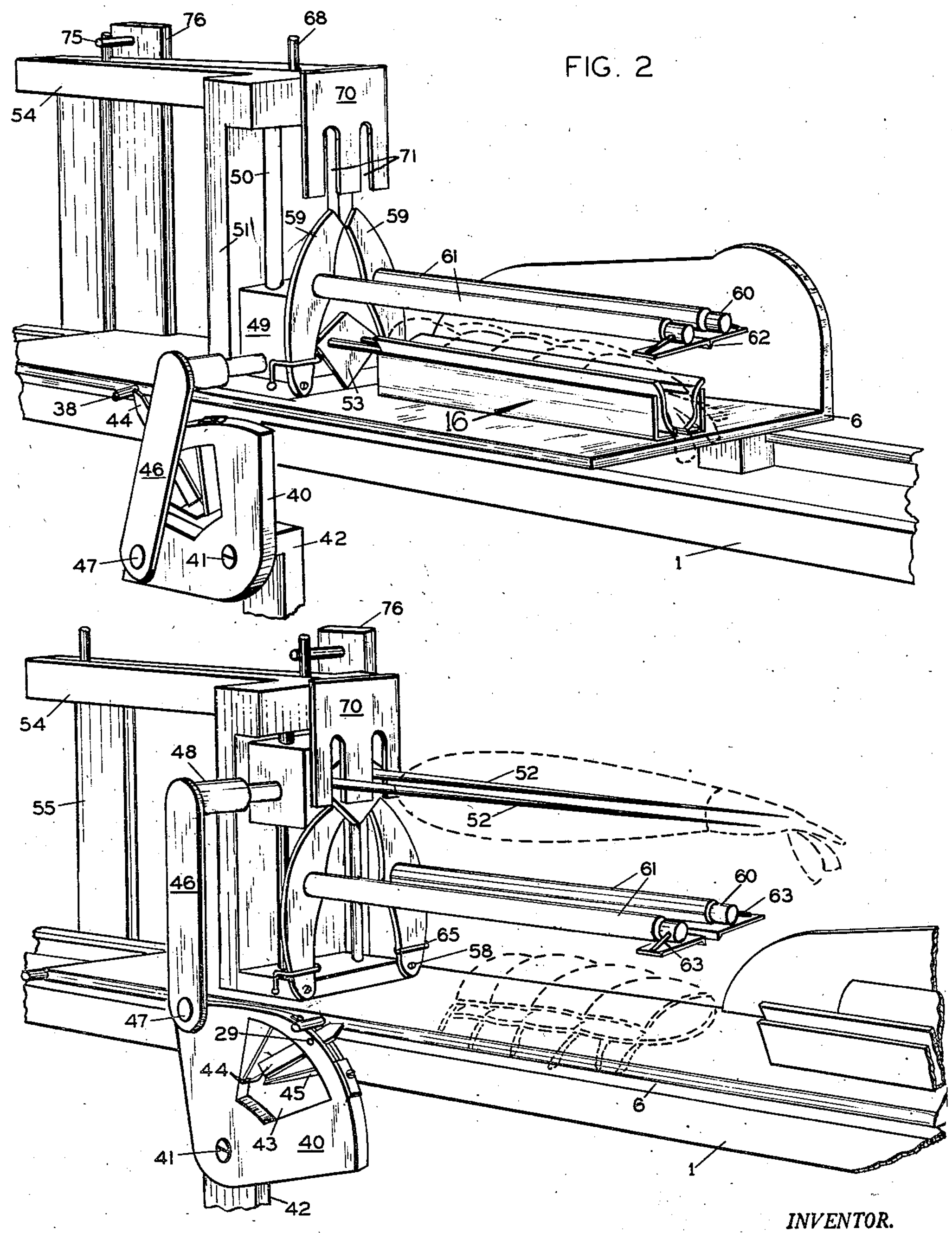
INVENTOR.
JACK YOUNG
BY Salvatore G. Militana
ATTORNEY Jan. 21, 1958 J. YOUNG 2,820,244
SHRIMP MACHINE
Filed June 28, 1956 4 Sheets-Sheet 3
FIG. 4
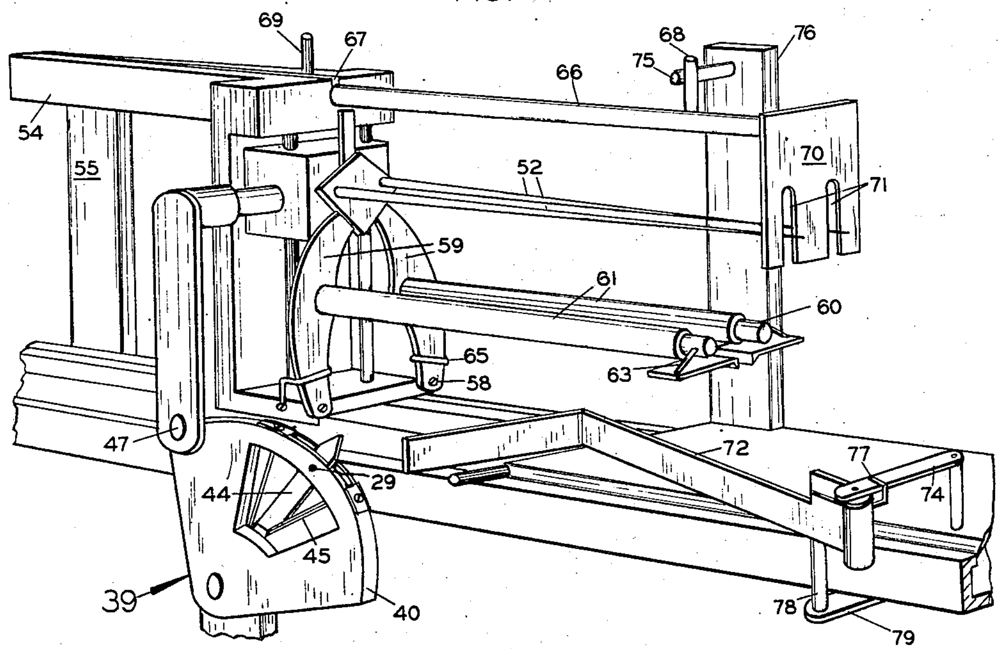
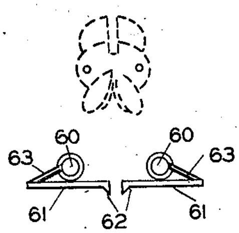
FIG. 11
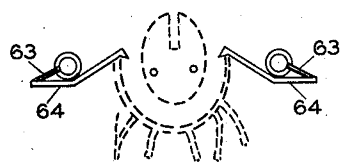
FIG. 10
72 6 78 73 77 74 75
FIG. 8
60 60 61 61
FIG. 9
INVENTOR.
JACK YOUNG
BY
Salvatore G. Militana
ATTORNEY Jan. 21, 1958 J. YOUNG 2,820,244

SHRIMP MACHINE

Filed June 28, 1956 4 Sheets-Sheet 4

INVENTOR.
JACK YOUNG
BY
Salvatore G. Militana
ATTORNEY

United States Patent Office 2,820,244

Patented Jan. 21, 1958

2,820,244

SHRIMP MACHINE

Jack Young, Coral Gables, Fla., assignor, by direct and mesne assignments, to Clara E. Jones, doing business as Jones Boat Yard and Storage Basin Application June 28, 1956, Serial No. 594,516

2 Claims. (Cl. 17—2)

The present invention relates to a device for automatically de-veining and shelling a shrimp.

At the present time shrimp are being de-veined and shelled by the costly method of utilizing slow, exacting hand labor; consequently mass production of the processing of shrimp is impossible without the hiring of vast numbers of persons needed to perform this labor in order to make the shrimp ready for the table.

Therefore, it is the primary object of the present invention to provide a device which will virtually automatically de-vein and shell a shrimp by mass production methods, yet requiring only one or at the most two persons to operate the device.

A further object of the present invention is to provide a device which will de-vein and shell a shrimp in an efficient manner, yet leave the tail of the shrimp intact, if desired.

A still further object of the present invention is to provide a device for de-veining and shelling shrimp which is simple in construction and operation.

A still further object of the present invention is to provide a device for de-veining and shelling a shrimp with a shrimp retaining mechanism which is sufficiently flexible to receive shrimp of varying sizes.

With these and other objects in view, the invention will be best understood from a consideration of the following detailed description taken in connection with the accompanying drawings, forming a part of the present specification with the understanding, however, that the invention is not confined to any strict conformity with the showing of the drawings, but may be changed or modified so long as such changes or modifications mark no material departure from the salient features of the invention as expressed in the appended claims.

In the drawings.

Figure 1 is a perspective view of my invention with the various parts thereof at their positions of initial operation.

Figure 2 is a fragmentary view in perspective of the shrimp shelling mechanism with the shrimp holder or cradle in its extreme horizontal travel away from its starting position.

Figure 3 is a fragmentary view in perspective similar to Figure 2, showing the operation of the shrimp shelling mechanism.

Figure 4 is a perspective view of the mechanism contained by Figures 2 and 3 showing the final step of removing the shelled shrimp and the shell from the device.

Figure 8 is a fragmentary top plan view showing the operation of the shell ejecting mechanism.

Figure 9 shows the relative position of the shelling blades and the shrimp at the commencement of the shelling operation.

Figure 10 shows the action of the shelling blades as the shrimp is carried upwards by the shrimp removing mechanism.

Figure 11 shows the shelled shrimp and the shelling blades at their final position prior to their return to the starting position.

Figure 5:
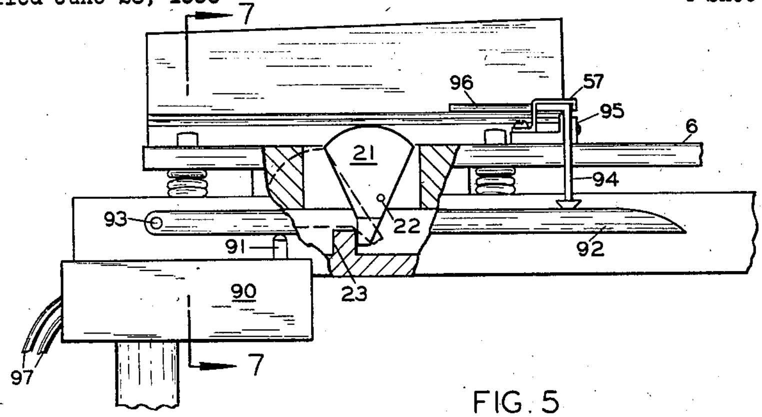
Figure 5 is a fragmentary side view partly broken away of the cradle and its support at the normal starting position.

Referring to the drawings and more particularly to the invention shown by Figure 1, the numeral 1 indicates a platform or table supported by a plurality of legs 2, 2 and having up-turned flanges 3, 3 for its side walls. On the inner surface of each of the side walls 3, 3 there is a longitudinally disposed groove 4 in which two pairs of opposed slide blocks 5 are slidably positioned. The free ends of the slide blocks 5, 5 are welded or otherwise secured to a carriage 6 which is slidably positioned on the table 1. An L-shaped member 7 is secured to a portion of the carriage 6 which overhangs beyond the side wall 3; the lower portion of the member 7 extending beneath the table 1. To this lower portion of the member 7 is secured a link 8 whose other end is pivotally secured to an arm 9 of a bell crank 10, itself pivotally mounted at 27. The second arm 11 of the bell crank 10 is pivotally secured to a crank lever 12 having its other end pivoted to a crank 13. The crank 13 is secured to a shaft of a speed reducing gear mechanism indicated generally by 14 which in turn is operatively connected to a motor 15. It is readily seen that upon operation of the motor 15 the aforementioned linkage mechanism will convert the rotary motion of the motor 15 to a reciprocating, translatory motion which will permit the carriage 6 to move back and forth on the table 1. Carried by the carriage 6 there is a cradle 16 adapted to receive and hold a shrimp firmly in position.

Figure 6:
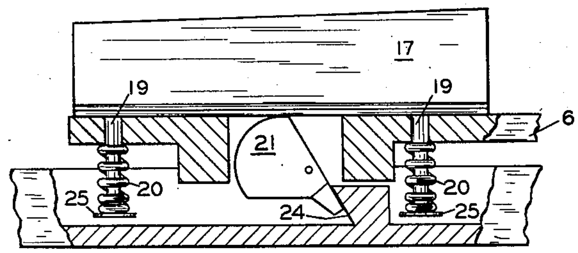
Figure 6 is a fragmentary side view partly broken away of approximately the cradle's extreme position of travel.
Figure 7:
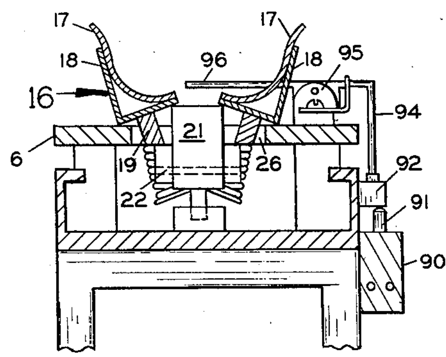
Figure 7 is a section taken through 7—7 of Figure 5.

The cradle 16 consists of two curved side walls 17, 17 to fit the general contour of the body of a shrimp, each of the walls 17 being mounted on an L-shaped support 18 (see Figures 5–7 inclusive) each of which has a pair of pins 19, 19 extending through openings in the carriage 6 with compression springs 20, 20 encircling the pins 19, 19 and extending between the underside surface of the carriage 6 and a spring retainer 25 secured to each of the free ends of the pins 19. Centrally disposed beneath the cradle 16 there is a cam 21 pivotally mounted at 22 to the carriage 6, and having its cam surface abutting against the horizontal legs of L-shaped cradle support 18 so that when the cam 21 is in the full line position shown by Figures 5 and 7 the cradle 16 is in its opened position. When the cam is pivoted to its dotted line position as shown by Figure 5 or the full line position in Figure 6, the cradle 16 is then in its closed position with a shrimp firmly gripped by the side walls 17. The cam 21 is operated by a block 23 mounted on the platform 1 in the vicinity of the normal starting or extreme right position as viewed in Figure 1, and a second block 24 mounted on the other end of platform 1 also in the path of the cam 21.

Secured to the side wall of the platform 1 there is a conventional micro switch box 90 having wires 97, 97 which are connected to the motor 15, with a switch operating pin 91 extending upwardly from the switch box 90 in the path of a lever 92 pivoted at 93 on the side wall of the carriage 6. On the free end of the switch operating lever 92 there is resting an actuating member 94 pivotally mounted in a support 95 having a portion 96 extending to a position along the bed of the cradle 16, which portion 96 is actuated when placing a shrimp in the cradle 16 so as to operate the micro switch 90. It can be readily seen that when the carriage 6 is moving back to its starting position namely to the left as viewed by Figure 5, the switch lever 92 strikes the pin 91 cutting off the power to the motor 15 thus stopping the movement of the carriage 6 on the platform 1 prior to its arriving at its extreme position thereon. Now while a shrimp is being placed in the cradle 16, the switch actuating member 94 is pushed downwardly by the force of the shrimp as it abuts against the portion 96 causing the lever 92 to pivot upwardly, a spring 57 snapping the lever back downwardly, actuating the micro switch 90, and starting the motor 15. The carriage 6 now continues to move in the same direction as it was moving prior to its having been stopped in the direction of the arrow shown in Figure 5, and the cam 21 strikes the block 23, pivoting the cam 21 about pivot 22 in a counetr clock direction to its dotted line position shown by Figure 5 so as to release the force it previously exerted against the cradle 16 (see Figure 7). The cradle 16 is now in its closed position and with the shrimp contained therein is carried by the carriage 6 toward the shelling mechanism to the right as viewed by Figure 6 until the cam 21 is operated by the block 24 approximately upon its arrival at the furthest movement of travel of the carriage 6. The cam 21 is pivoted about 22 in a clockwise direction and the two sections of the cradle 16 are caused to be pivoted to the position shown by Figure 7, thus releasing the shrimp of its firm grip.

Directly above the cradle 16 at its starting position and centered on the longitudinal axis thereof, there is a circular saw blade 30 which is mounted on the free end of a motor shaft 31 of a motor 32. The entire assembly is supported by a lever 33 pivotally mounted on a post 34 which is secured to the platform 1. A roller 35 is rotatably mounted on the shaft 31 and engages a cam surface formed on a plate member 36 secured to the carriage 6 adjacent to the cradle 16. The cam surface of the member 36 permits the saw blade 30 to cut into the body of the shrimp at a constant depth from one end thereof to the other, yet preventing the tail of the shrimp from being cut into. This cut made in the shrimp is of sufficient width and depth to remove the black vein in the shrimp. The motor 32, as likewise is the motor 15, is connected to a source of power not shown in the drawings. A spring 99 relieves part of the weight of the motor 32 on the member 36 by being connected to the free end of the lever 33 on one end and a fixed arm 28 secured to the post 34 at its other end.

Secured to the face of the side wall of the carriage 6 and extending outwardly therefrom are two pins 37 and 38; the pin 37 is positioned at the extreme end of the carriage 6 and the pin 38 is positioned approximately at the mid portion thereof. The pin 37 and 38 actuate a cam mechanism 39 consisting of a cam block 40 pivotally mounted on a shaft 41 which is supported by a support structure 42 shown only in part. The cam block 40 is slotted in its upper portion to form a cavity 43 which receives a pin 44 extending beyond the confines of the block 40 and pivotally mounted at 29 at its mid portion to the cam block 40. The pin 44 is maintained in an upright position by two leaf springs 45, 45 each having one end tensioned against the lower end of the pin 44 and the other end secured to the end wall of the block 40 (see Figures 2 to 4). A cam link 46 is pivotally mounted at 47 to the face of the cam block 40 at one end and secured to a shaft 48 at its other end. A reciprocating block 49 which is secured to the other end of the shaft 48 is slidably mounted on a pair of guide rods 50, 50. A U-shaped support member 51 is mounted on the table 1 by a bracket arrangement 54, 55 in a position elevated above the carriage 6 to permit the latter to oscillate back and forth therebelow, with the leg portions of the support member 51 being bored to receive and maintain secured thereto the rods 50, 50. Extending in a direction toward the cradle 16 and in the path thereof there is a pair of skewers 52 having their base portions secured to the block 49 and a diamond shaped spacer member 53 mounted on the skewers 52 in spaced relation to the block 49. The function of the spacer member 53 is hereinafter explained in detail.

On the face of the lower leg of the U-shaped member 51 there are pivot bolts 58, 58 on each end thereof, upon which is mounted for pivotal movement a pair of scraper blade supporting members 59, 59 to which are secured a pair of rods 60, 60 extending in a plane parallel to that of the skewers 52, 52. The inside surfaces of the members 59, 59 are arcuate in shape, as is hereinafter explained in detail. A pair of scraper blades 61, 61 each having a downwardly projecting sharpened edge or flanged portion 62 is rotatably mounted on the rods 60, 60 with the sharpened edges 62, 62 adjacent to each other. The scraper or shelling blades 61, 61 are each normally maintained in an extended horizontal position by means of a pin 63 which has one end secured to the free end of the scraper support rods 60 and the other end welded or otherwise secured to a tab 64 formed from an end portion of the blades 61. Since the blades 61 are made of flexible spring metal, the tabs 64 will bend when pressure is applied upwardly by the body of the shrimp against the blades 61, 61 as shown by Figure 10. When the shrimp has passed beyond the blades 61, 61 as shown by Figure 11, the blades 61, 61 return to their normal horizontal position. The members 59, 59 are each tensioned towards each other by a spring member 65 secured at the lower leg of the U-shaped support 51 and bearing against the member 59.

As can be readily seen, when the reciprocating block 49 begins to move upwardly, the diamond shaped surfaces of the spacer member 53 engage the inner edges of the blade support members 59, 59 causing the members 59 to pivot outwardly carrying with them the sharpened ends of blades 61, 61 which move away from each other to form a gap through which a shrimp passes as is hereinafter more fully described in a description of the operation of the device.

Mounted directly above and in line with the sharpened edges 62, 62 of the scraper blades 61, 61 there is a bar 66 slidably mounted in a groove 67 extending through the upper portion of the U-shaped support 51 and the bracket 54. A pair of pins 68 and 69 extending upwardly are welded or otherwise secured to the bar 66 at approximately each end thereof. Depending from the free end of the bar 66 and secured thereto, there is a plate or rake 70 having a pair of slots 71, 71 cut in the lower half of the plate 70 to receive the skewers 52, 52 when the latter move upwardly to their top most position (see Figure 3).

A pin 75 which extends at right angles to and between the pins 68 and 69 is secured to a support member 76 carried by the carriage 6. When the carriage moves to the left as seen by Figure 1, it carries the support 76 and the pin 75 into the path of the pin 69 causing the rod 66 and rake 70 to move to the left until the carriage reverses its direction and commences moving to the right. The pin 75 is carried to the right the full distance between the pins 68 and 69 before the pin 75 engages the pin 68 and carries the rod 66 and plate 70 to its extreme right or starting position. The function of the rake 70 is to remove the shelled shrimp from the skewers 52, 52 (see Figures 3 and 4).

The shell stripped from the shrimp by the shelling blades 61, 61 falls to the carriage 6 and is removed therefrom by a shell ejector arm 72 formed with a right angle bend therein. The ejector arm 72 is pivoted at 73 at a position spaced from the carriage 6 by a link 74 secured at one end to a pin 75 mounted on the carriage 6 and at its other end to the pivot 73. A spring 77 mounted at the pivot 73 is tensioned to bias the arm 72 in the solid line position shown in Figure 8. A pin 78 extending upwardly alongside the carriage 6 in the path of the ejector arm 72 is secured to a member 79 which is itself secured to the under side of the table 1.

As shown by Figure 1, the device is in its normal starting position ready to receive a shrimp in the cradle 16 and commence the operation of de-veining and shelling of the shrimp. As the shrimp is placed in the cradle 16 with its legs extending downwardly and the tail in the direction away from the saw blade 30, pressure is applied against the upper portion 96 of the switch actuating member 94. The lever 92 is caused to be pivoted about 93 to depress the pin 91 which actuates the switch 90 causing the motor 15 to be energized to operate the bell crank system 10. The carriage 6, not having reached its extreme right position (as seen in Figure 1) in its previous cycle of operation, now moves to the right (in Figure 5 the movement is in the direction of the arrow) at which time the free end of the cam 21 abuts against the block 23 and pivots about 22 in a counter clockwise direction, to release the cradle 18; the sections of the cradle pivoting towards each other and the shrimp is then held tightly by the side walls 17, 17. The carriage 6 now begins to move in a forward direction toward the shelling mechanism. The roller 35 engages the cammed end wall of the member 36 as the rotating blade 30 begins cutting into and thru the shell and flesh of the shrimp at a constant depth therein, thus removing the black vein from the shrimp. As the cradle 16 continues to move, the pin 37 carried by the forward moving carriage 6 engages the cam pin 44, rotates the cam block 40 about the pivot 41 and causes the block 49 to slide downwardly to its lowermost position. The skewers 52, 52 are now in the path of the shrimp, and as the cradle 16 continues to move forwardly the shrimp is impaled by the skewers 52, 52. At the same time the rake 70 is moved to its extreme left position by the pin 75 as it engages the pin 69 to move the rod 66 to the extreme left position. Also as the cradle 16 arrives to the position above the cam operating block 24 (see Figure 6), the cam 21 is caused to be pivoted about the pivot 22 and the cradle 16 pivoted against the spring pressure 20 compelling the two halves of the cradle 16 to rock in a direction away from each other thus releasing its firm grip on the shrimp. At this time the carriage is approximately beneath the shelling mechanism as shown by Figure 2. Due to the spring action of the leaf springs 45, 45 both the pins 37 and 38 slide past the pin 44 of the cam block 40. Now as the carriage 6 begins moving in the reverse direction, the pin 38 engages the pin 44 of the cam mechanism 39 and the cam block 40 commences rotating in a clockwise direction causing the block 49 to slide upwardly carrying the skewers 52, 52 and the shrimp impaled thereon. Immediately prior to the upward movement of the block 49 with the shrimp impaled on the skewers 52, the sharpened flanges 62, 62 of the blades 61, 61 are positioned adjacent the longitudinal cut made by the saw 30 in the shrimp (see Figure 9). Now as the shrimp removing mechanism moves upwardly, the spacer 53 sliding alongside the inside curved surface of the pivoted members 59, 59 causes the blade holders 60, 60 and the blades 61, 61 to move outwardly away from each other permitting the shrimp to move upwardly therebetween as the sharpened blade edges 62 peel the shell away from the shrimp (see Figure 10). As the carriage 6 continues to move toward the right, towards its starting position, the block 49 moves to its top most position as shown by Figure 3, the spacer 53 having passed beyond and above the members 59, 59 causing the blades 61, 61 to swing towards each other as shown by Figure 11 thus bringing about a complete separation of the shell from the shrimp, the shell falling on to the carriage 6 since the spacer 53 prevents the blade edges 62 from closing together to hold the removed shell (see Figure 11). The pin 75 now engages the pin 68 causing the rake 70 which now straddles the skewers 52, 52 to move to the right and push the shrimp off the skewers 52 (see Figure 4). The shrimp can be then taken from the device by hand. As the carriage moves back towards its starting position, the shell ejector 72 impinges against the pin 78 compelling the ejector 72 to swing outwardly to the dotted position shown in Figure 8, sweeping the shell from the carriage 6. Also, as the carriage approaches the starting position which is short of the extreme right position as viewed by Figure 1, the actuating member 94 impinges on the free end of the lever 92 causing the lever 92 to actuate the switch pin 91 and cut off the switch 90 stopping the motor 15. Now, the cradle 16 is in position to commence operation when the next shrimp is placed therein.

While the invention has been described with reference to a certain preferred embodiment thereof, which gives satisfactory results, it will be understood by those skilled in the art to which the invention pertains, after understanding the invention, that various changes and modifications may be made without departing from the spirit and scope of the invention, and it is my intention therefore to cover in the appended claims all such changes and modifications.

Having described my invention, what I claim as new is:

1. A shrimp shell removing machine comprising a frame, impaling means mounted on said frame adapted to receive a shrimp, support means secured to the rear portion of said impaling means, power actuated means connected to said support means for movement of said impaling means, a pair of blades pivotally mounted in the path of movement of said impaling means, said blades having flange portions abutting each other and extending in the direction of said impaling means, means operatively associated with said blades and mounting said blades for movement transverse to the path of movement of said impaling means, and further means cooperatively connecting said impaling means and said last named means for substantially simultaneous movement of said blades upon movement of said impaling means.

2. A device of the class described comprising a support, impaling means movably mounted on said support, guide means operatively connected to said support, power actuated means operatively connected to said support for reciprocating movement of said support along said guide means, a pair of elongated members mounted on said support and positioned in spaced and parallel relation to said impaling means, a blade pivotally mounted on each of said elongated members and having flanged edge portions extending in the path of movement of said impaling means, yielding means secured to said blade and urging said flanged edge portions to abut each other, support means secured to said elongated members, means operatively associated with said support means and pivoting said support means whereby said blades are swung in a direction away from each other, and means mounted on said impaling means cooperatively engaging said support means whereby said blades ars swung in a direction away from each other upon movement of said impaling means.

References Cited in the file of this patent

UNITED STATES PATENTS

| | | |
|---|---|---|
| 2,659,930 | Jagger | Nov. 24, 1953 |
| 2,685,705 | Streich et al. | Aug. 10, 1954 |